(12) United States Patent
Baratti et al.

(10) Patent No.: US 9,321,308 B2
(45) Date of Patent: Apr. 26, 2016

(54) WHEEL HUB BEARING UNIT FOR VEHICLES AND ASSOCIATED METHOD

(71) Applicants: Paolo Baratti, Turin (IT); Andrea Serafini, Pinerolo TO (IT)

(72) Inventors: Paolo Baratti, Turin (IT); Andrea Serafini, Pinerolo TO (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/522,898

(22) Filed: Oct. 24, 2014

(65) Prior Publication Data
US 2015/0115696 A1  Apr. 30, 2015

(30) Foreign Application Priority Data

Oct. 25, 2013  (IT) .................................. TO13A0866

(51) Int. Cl.
*B60B 27/00* (2006.01)
*F16C 19/18* (2006.01)
*F16C 33/64* (2006.01)

(52) U.S. Cl.
CPC ............ *B60B 27/0005* (2013.01); *B60B 27/00* (2013.01); *B60B 27/0094* (2013.01); *B60B 2310/616* (2013.01); *B60B 2310/654* (2013.01); *B60B 2900/321* (2013.01); *F16C 19/186* (2013.01); *F16C 33/64* (2013.01); *Y10T 29/49535* (2015.01)

(58) Field of Classification Search
CPC  B60B 27/00; B60B 27/0005; B60B 27/0094; B60B 2310/616; B60B 2310/654; B60B 27/005; B60B 27/094

USPC ............ 301/105.1, 108.1, 109, 110; 384/476, 384/537, 544
See application file for complete search history.

(56) References Cited

U.S. PATENT DOCUMENTS

| | | | | |
|---|---|---|---|---|
| 7,524,115 B2 * | 4/2009 | Komori | ................... | B60B 27/00 384/476 |
| 7,824,107 B2 * | 11/2010 | Takahashi | ........... | B60B 27/0005 301/105.1 |
| 8,256,968 B2 * | 9/2012 | Kapaan | ................. | B60B 7/0013 301/105.1 |
| 2006/0177169 A1 | 8/2006 | Takahashi et al. | | |
| 2007/0147719 A1 | 6/2007 | Komori | | |
| 2010/0301666 A1 * | 12/2010 | Shibata | ............... | B60B 27/0005 301/109 |

FOREIGN PATENT DOCUMENTS

WO  2008145162 A1  12/2008

* cited by examiner

*Primary Examiner* — John Walters
(74) *Attorney, Agent, or Firm* — Bryan Peckjian; SKF USA Inc. Patent Dept.

(57) ABSTRACT

A wheel hub bearing unit including a plurality of rolling bodies disposed between annular elements. One of the annular elements is a rotating element that includes a spindle on a side facing the outboard side of the vehicle having a mounting flange adapted to receive a vehicle wheel. A frontal surface of the mounting flange is covered by a layer of UV photo-polimerizable synthetic plastic material having a predetermined thickness deposited on the frontal surface of the flange in the non-polimerized state by a mixed air spraying nozzle, by rotating the wheel hub bearing unit about a symmetry axis thereof with the nozzle arranged at a radial distance from a peripherally outer edge of the flange, and has a spraying axis which forms, with the symmetry axis, an angle from 20° to 80°; the synthetic plastic material being sprayed by the nozzle at a temperature higher than the room temperature.

6 Claims, 2 Drawing Sheets

WHEEL HUB BEARING UNIT FOR VEHICLES AND ASSOCIATED METHOD

TECHNICAL FIELD OF THE INVENTION

The present invention relates to a wheel hub bearing unit for vehicles. The invention also relates to a method for manufacturing a wheel hub bearing unit for vehicles. Here and below, "run-out" means the rotation oscillation allowed for the outboard flange of the unit, intended to receive in use a vehicle wheel.

PRIOR ART

As it is known from US2010/0301666A1, for example, a wheel hub bearing unit comprises a radially outer annular element or member provided radially on the inside with first rolling tracks, a radially inner annular element or member provided radially on the outside with second rolling tracks facing and opposite to the first rolling tracks and a plurality of rolling bodies interposed between the radially inner and outer elements and engaging the rolling tracks. One of the annular elements, which acts in use as a rotating element, generally consisting of the radially inner member, comprises a spindle provided, on the outboard side of the unit, with a mounting flange for a vehicle wheel and a possible cylindrical guiding collar which axially protrudes from the mounting flange, on the side opposite to the spindle, with which it is coaxial.

In use, both the collar (when present) and the mounting flange are subject to coming in contact with several contaminants (water, mud, dust, sand) and, during the wheel mounting and dismounting operations, for example when changing the tires, are subject to chafing. These parts of the wheel hub bearing unit may thus be easily subject to corrosion, with formation of rust.

A solution known in the art is to coat at least a frontal surface of the mounting flange with a protective metal layer, e.g. a galvanic coating of zinc, which acts as a sacrificial anode. However, this solution has the drawback of needing to carry out the galvanic coating on the annular element provided with the flange before it is mounted on the wheel hub bearing unit. Once mounted, the wheel hub bearing unit must be tested to verify the matching to the required run-out tolerances thereof, which operation often requires to carry out mechanical machining on the flange to remove superficial parts in order to reduce the oscillations within acceptable limits (in essence, a sort of balancing is carried out, such as that which is carried out on tires, but removing material instead of adding counterweights); it follows that part of the protective layer is removed, with the consequent possibility of starting rust.

The solution known from US2010/0301666A1, instead, provides for covering with a protective layer, after mounting the wheel hub bearing unit, the guiding collar only, which is definitely one of the most exposed parts, by applying a layer of photopolimerizable (in this case UV polimerizable) synthetic material. According to this solution, only the collar is coated, since the known methods of applying photopolimerizable products do not ensure obtaining coating layers of even thickness. Therefore, if these were also applied on the flange, it would be liable to exceed the allowed run-out tolerances, since the presence of non-uniform coating layers could produce the triggering of vibrations and oscillations, resulting in the generation of undesired noise.

SUMMARY OF THE INVENTION

It is the object of the present invention to provide a wheel hub bearing unit protected from corrosion over the entire mounting flange and respecting the run-out tolerances required. It is also an object of the invention to provide a method for manufacturing such a wheel hub bearing unit.

According to the invention, a wheel hub bearing unit and a manufacturing method for such a wheel hub bearing unit are thus provided, having the features set forth in the appended claims.

BRIEF DESCRIPTION OF THE DRAWINGS

The invention will now be described with reference to the accompanying drawings, which show a non-limiting embodiment thereof, in which.

DETAILED DESCRIPTION

Figure 1:
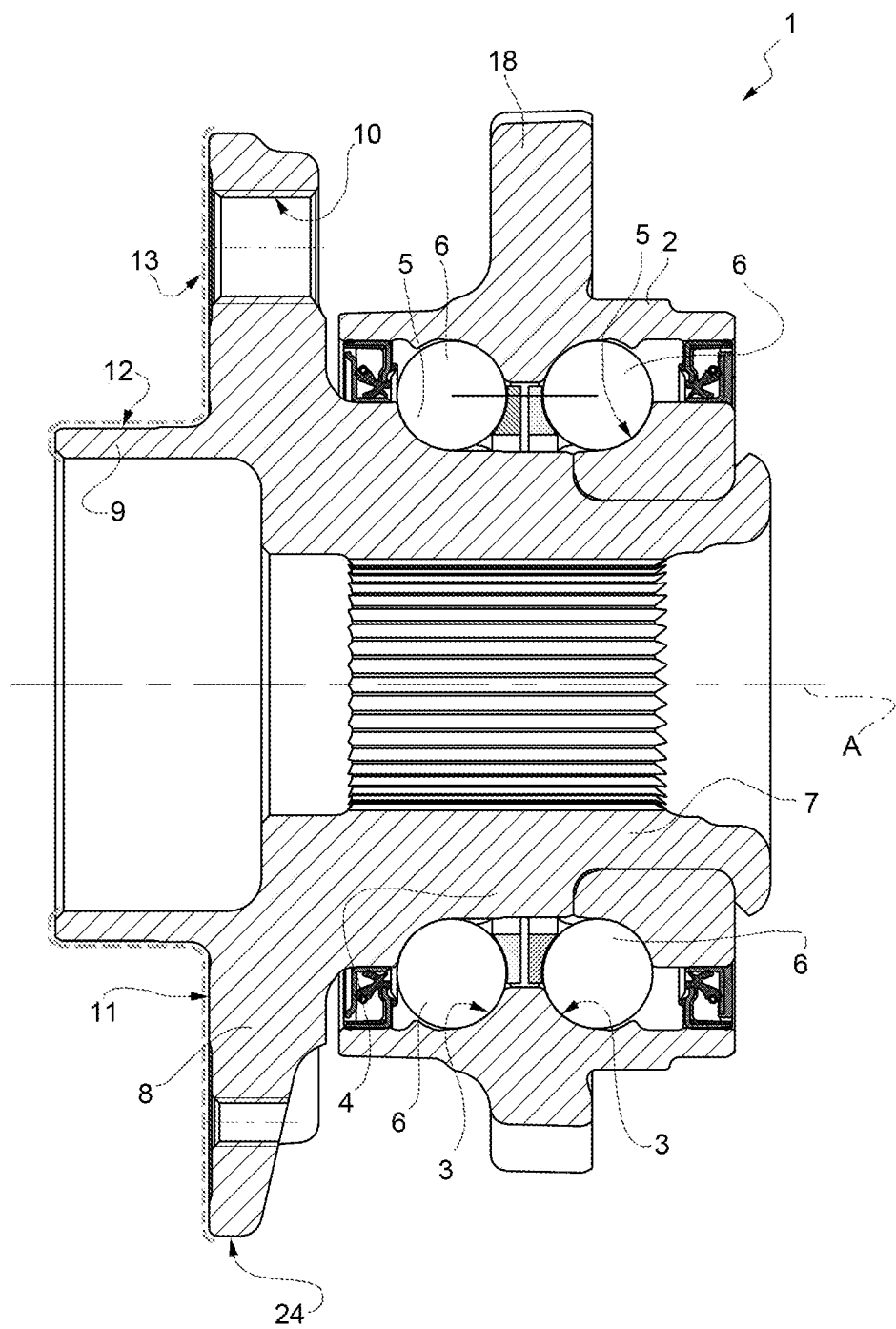
FIG. 1 diagrammatically shows a radially sectional elevation view of a wheel hub bearing unit made according to the invention.

With reference to FIG. 1, numeral 1 indicates a wheel hub bearing unit for vehicles as a whole. The wheel hub bearing unit 1 comprises, in the non-limiting embodiment shown, a radially outer annular element or member or ring 2 provided radially on the inside with first rolling tracks 3, a radially inner annular element or member or ring provided radially on the outside with second rolling tracks 5 facing and opposite to the first rolling tracks 3 and a plurality of rolling bodies interposed between the radially outer 2 and inner 3 elements and engaging the rolling tracks 3 and 5, in this case forming two crowns of balls.

One of the annular elements 2, 4, which acts in use as a rotating element, generally consisting of the radially inner member and, in the non-limiting embodiment, precisely consisting of the inner ring 4, comprises a spindle 7 provided, on the outboard side of unit 1, i.e. towards the parts of spindle 7 and unit 1 intended to be facing in use the outboard side of the vehicle, with a mounting flange 8 for a vehicle wheel, (known and not shown for simplicity).

Ring 4 is also preferably provided with a cylindrical guiding or pilot collar or annular sleeve-like portion 9, which axially protrudes from the mounting flange 8, on the side opposite to spindle 7, with which it is coaxial. The collar or sleeve-like portion 9 has the function, in use, to receive the brake disc or drum and the wheel, the latter being then fixed to flange 8, which is for this purpose provided with a plurality of through holes 10 arranged in a crown.

Towards the outboard side, flange 8 is delimited by a flat frontal surface 11 interrupted only by the holes 10 that come out therethrough. From such a surface 11, the collar or pilot portion 9, which is delimited radially on the outside by a lateral peripheral surface 12, overhangingly perpendicularly extends.

Rings 2 and 4 are coaxial with spindle 7 and the collar or pilot portion 9 and all these elements are coaxial with a symmetry axis A of unit 1.

According to the invention, at least the frontal surface 11 of the mounting flange 8 is entirely covered by a layer 13 of UV photopolimerizable synthetic plastic material, diagrammatically shown out of scale in broken lines in FIG. 1. Layer 13 has a predetermined thickness and, according to the invention, it has been deposited on the frontal surface 11 of flange 8 in the non-polimerized state by means of (FIG. 2) a mixed air spraying nozzle 14 with a tolerance not exceeding 5 microns on the predetermined thickness.

At least the lateral peripheral surface 12 of the collar or sleeve portion 9 is also entirely covered by the same layer 13 of UV photopolimerizable synthetic plastic material which covers the frontal surface 11 of the mounting flange 8 and which has been formed simultaneously on flange 8 and collar 9 by means of the mixed air spraying nozzle 14 with a tolerance not exceeding 5 microns on the predetermined thickness on both flange 8 and collar 9.

The predetermined thickness of the layer 13 of UV photopolimerizable synthetic plastic material is from 30 to 40 microns.

Thereby, the wheel hub bearing unit 1 has a run-out tolerance lower than or equal to 15 microns.

The through holes 10 pass through the layer 13 of UV photopolimerizable synthetic plastic material, since they were not affected by the step of spraying.

Figure 2:
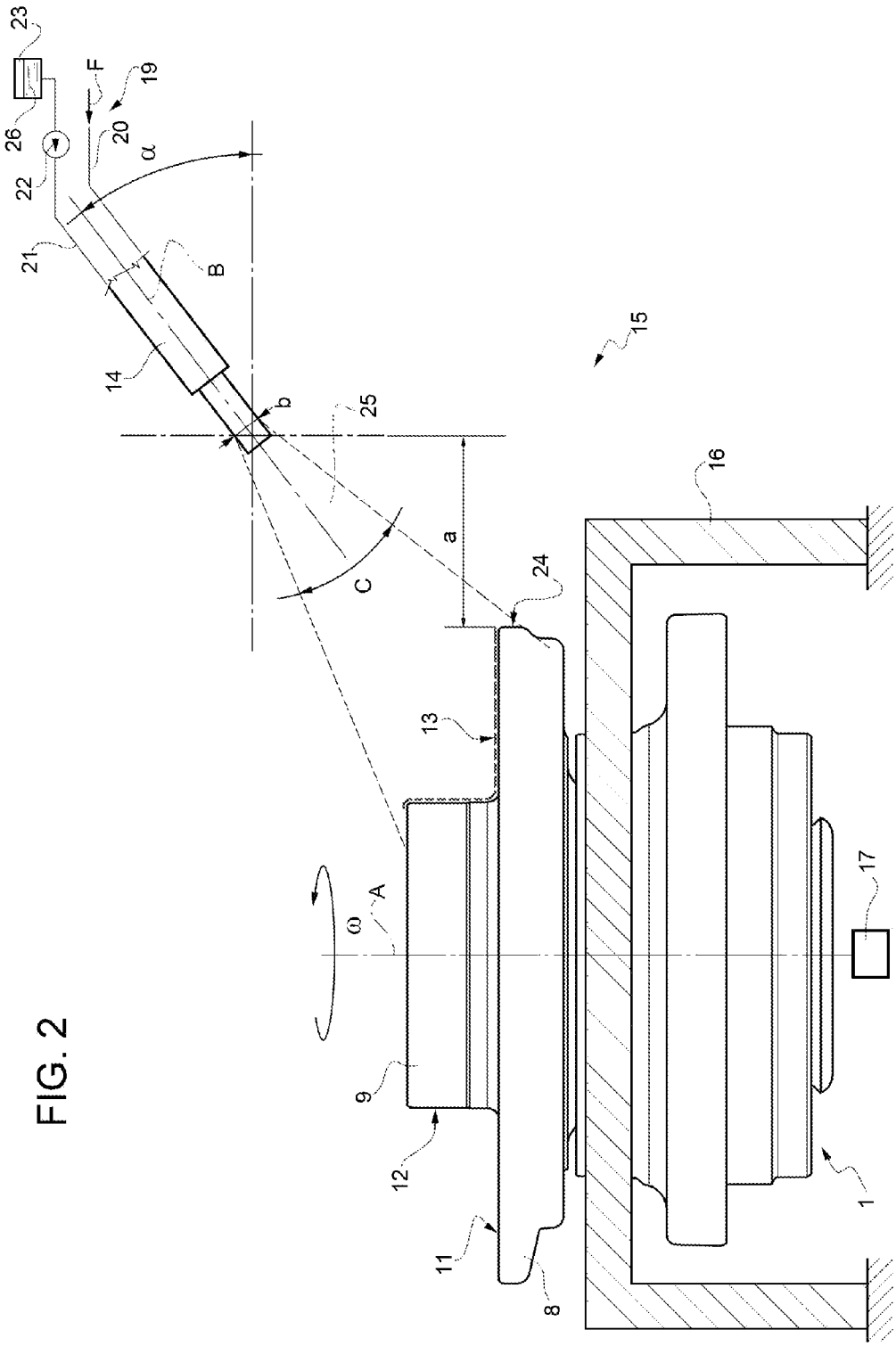
FIG. 2 diagrammatically shows a partially sectional top plan view of a step of a method for manufacturing the wheel hub bearing unit in FIG. 1 according to the invention.

The wheel hub bearing unit 1 is made by means of a method in several steps, the main step of which is shown in FIG. 2.

Firstly, the wheel hub bearing unit 1 is completely assembled and, optionally, when needed, a mechanical machining with chip removal is carried out on the frontal surface 11 of flange 8, so as to make unit 1 fall within an allowed run-out tolerance. Such a mechanical machining is generally carried out with a tolerance equal to or lower than 10 microns.

The wheel hub bearing unit 1 completely assembled and already mechanically machined on surface 11, thus falling within the allowed run-out tolerances, is then taken to and mounted on an apparatus (diagrammatically shown in FIG. 2 and indicated at 15 as a whole).

Apparatus 15 comprises nozzle 14, a support 16 and an engine 17, diagrammatically shown as a block. The wheel hub bearing unit 1 is mounted on support 16 so as that the annular element 4, intended in use to be the rotating element of unit 1, is idly carried by support 16, which has a high stiffness, so as to avoid possible vibrations. For example, the annular element 2 is angularly fixed so as to be integral with support 16, which is stationary. In the non-limiting embodiment shown, the annular element 2 is also provided with a flange 18 for fixing, in use, unit 1 on the strut of a vehicle suspension and therefore flange 18 may be used for integrally fixing unit 1 to support 16. If flange 18 is not present, a different fixing system will be used, as apparent to those skilled in the art and thus not described.

Engine 17 is connected by means of a transmission system, apparent to those skilled in the art and thus not shown for simplicity, to the annular element 2, so as to cause element 2, and flange 8 and collar 9 therewith, to rotate about symmetry axis A when engine 17 is actuated.

Nozzle 14 is a mixed air spraying nozzle, of the so-called AIRMIX® type. It is serviced by a known power supply system 19, diagrammatically shown as blocks in FIG. 2, comprising a compressed air feeding line 20 and a pressurized line 21 for supplying a product to be sprayed by means of nozzle 14, which line 21 is thus equipped with a pump 22, which draws from a tank 23.

According to the invention, the method for obtaining the wheel hub bearing unit thus comprises, temporally in sequence after the step of machining by chip removal the parts of surface 11, a step of coating the frontal surface 11 of flange 8 with a layer 13 of a UV photopolimerizable synthetic plastic material, indicated by 26 and contained within tank 23, which is deposited on the frontal surface 11 of flange 8 (and on the surface 12 of collar 9) in the non-polimerized state by means of the mixed air spraying nozzle 14.

According to the main feature of the invention, in order to obtain a layer 13 of even thickness unless having very tight tolerances, the step of spraying deposition of the photopolimerizable material in the non-polimerized state is carried out by rotating the hub bearing unit 1 about the symmetry axis A thereof at a predetermined speed, while keeping the frontal surface 11 of flange 8 exposed towards the spraying nozzle 14; and, in combination, by arranging the mixed air spraying nozzle 14 at a predetermined radial distance "a" from a peripherally outer edge 24 of the mounting flange, also arranging nozzle 14 with a spraying axis B thereof that forms, with the symmetry axis A of the wheel hub bearing unit 1, an angle $\alpha$ different from both zero and 90° and comprised between 20° and 80°, in a plane containing both axes A and B.

Here and below, "spraying axis" means the symmetry axis of a jet 25 of photopolimerizable material and along which the photopolimerizable material itself, in the liquid state and mixed with air, is projected towards flange 8 and, in the example shown, also towards the collar or pilot sleeve-like portion 9, to form layer 13 on the surfaces 11 and 12.

Furthermore, the UV photopolimerizable synthetic plastic material 26 is sprayed by nozzle 14 at the liquid state, but at a temperature higher than the room temperature, in particular from 40° C. to 60° C., so as to adjust the viscosity thereof to a desired level.

With the combination of such expedients, a layer 13 of UV photopolimerizable synthetic plastic material 26 which is absolutely even in thickness (but totally unconceivable a priori) is surprisingly obtained.

To this purpose, moreover, the predetermined radial distance "a" is chosen so as to be from 15 to 30 mm, while the predetermined rotation speed of the wheel hub bearing unit 1 is kept from 45 to 75 RPM; the UV photopolimerizable synthetic plastic material 26 is then sprayed by nozzle 14 towards flange 8 (and collar 9) over a time ranging from 6 to 12 seconds.

The photopolimerizable material 26 used according to the invention consists of a solvent-free, water-based paint containing substituted tri-acrylates, for example it is the product EU-17-7001/0 from Lankwitzer, available on the market.

After the step of spraying shown in FIG. 2, the layer 13 of UV photopolimerizable synthetic plastic material 26 is irradiated by means of UV over a time ranging from 10 to 15 seconds, by operating according to known techniques, thus apparent for those skilled in the art, which are not described for simplicity.

In order to achieve the desired results, nozzle 14 has an outlet opening "b" with a passage section from 0.4 to 1.4 mm wide; furthermore, the UV photopolimerizable synthetic plastic material 26 is atomized in nozzle 14 by an air flow F (FIG. 2), indicated by the arrow, at a pressure from 2 to 10 bars, thus feeding compressed air in line 20 at a pressure from 2 to 10 bars. The material 26 itself is also fed by pump 22 at a pressure from 2 to 10 bars.

Thereby, a layer 13 of thickness from 30 to 40 microns is deposited, having a tolerance (i.e. an allowed thickness variation) lower than 5 microns which, when added to the allowed tolerance for the tool machining step (equal to or lower than 10 microns), finally provides a unit 1 protected from corrosion over all the surfaces 11 and 12, by means of the layer 13 of photopolimerized material 16 and which falls within the most severe run-out tolerances, thus remaining below 15 microns.

The invention claimed is:

1. A method for manufacturing a wheel hub bearing unit for a vehicle, the method comprising steps of:
providing a radially outer annular element provided radially on an inside with first rolling tracks, a radially inner annular element provided radially on an outside with second rolling tracks facing and opposite to the first rolling tracks; and a plurality of rolling bodies disposed between the radially inner and outer elements and engaging the rolling tracks; wherein one of the annular elements acts as a rotating element and includes a spindle provided, on a side facing an outboard side of the vehicle, with a mounting flange adapted to receive a vehicle wheel; and wherein at least a frontal surface of the mounting flange is covered by a layer of UV photopolimerizable synthetic plastic material having a thickness from 30 to 40 microns and deposited on a frontal surface of the flange in the non-polimerized state with a tolerance not exceeding 5 microns on the thickness; and the wheel hub bearing unit having a run out tolerance less than or equal to 15 microns, completely assembling the wheel hub bearing unit, bringing the wheel hub bearing unit to fall within the allowed run-out tolerances; and coating a frontal surface of a mounting flange of an annular element, rotating, of the wheel hub bearing unit, carried by a spindle of the annular element, rotating on the side facing in use the outboard side of the vehicle with a layer of UV photopolimerizable synthetic plastic material deposited on the frontal surface of the flange in the non-polimerized state; wherein, in combination:

i) the layer of UV photopolimerizable synthetic plastic material is deposited by means of a mixed air spraying nozzle;

ii) the wheel hub bearing unit is rotated about a symmetry axis thereof at a predetermined speed while keeping the frontal surface of the mounting flange exposed to the spraying nozzle;

iii) the mixed air spraying nozzle is arranged at a predetermined radial distance from a peripherally outer edge of the mounting flange and has a spraying axis which forms, with the symmetry axis of the wheel hub bearing unit, an angle from 20° to 80° in a plane containing both axes;

iv) the UV photopolimerizable synthetic plastic material is sprayed by the nozzle at a temperature higher than the room temperature.

2. The method according to claim 1, wherein the predetermined radial distance is from 15 to 30 mm.

3. The method according to claim 1, wherein the predetermined rotation speed of the wheel hub bearing unit is from 45 to 75 RPM, the UV photopolimerizable synthetic plastic material being sprayed by the nozzle towards the flange for a time ranging from 6 to 12 seconds.

4. The method according to claims 1, wherein the temperature of the UV photopolimerizable synthetic plastic material that is sprayed is from 40° C. to 60° C., the material consisting of a water-based, solvent-free paint containing substituted tri-acrylates.

5. The method according to claim 1, wherein after the step of spraying, the layer of UV photopolimerizable synthetic plastic material is irradiated by UV light for a time ranging from 10 to 15 seconds.

6. The method according to claim 1, wherein the nozzle has an outlet opening with a width of the passage section in the range from 0.4 to 1.4 mm; and the UV photopolimerizable synthetic plastic material is atomized in the nozzle by an air flow, at a pressure from 2 to 10 bars.

* * * * *